United States Patent

Van Paesschen et al.

[15] 3,656,996

[45] Apr. 18, 1972

[54] ANTISTATIC POLYESTER FILM

[72] Inventors: August Jean Van Paesschen, Antwerp; Lucien Janbaptist Van Gossum, Kontich, both of Belgium

[73] Assignee: Gevaert-AGFA N.V., Mortsel, Belgium

[22] Filed: Apr. 10, 1970

[21] Appl. No.: 27,452

[30] Foreign Application Priority Data

Apr. 11, 1969 Great Britain........................18,682/69

[52] U.S. Cl............................117/68, 117/92, 117/138.8 F, 117/168
[51] Int. Cl. ....................................B32b 27/06, C09k 3/16
[58] Field of Search ........................117/138.8 F, 168, 68, 92; 96/114.2

[56] References Cited

UNITED STATES PATENTS

| | | | |
|---|---|---|---|
| 2,973,263 | 2/1961 | Kaszuba et al. | 117/168 |
| 3,245,905 | 4/1966 | White et al. | 117/138.8 F |
| 3,118,784 | 1/1964 | Webers | 117/138.8 F |
| 3,312,564 | 4/1967 | Barbour | 117/138.8 F |
| 3,242,117 | 3/1966 | Cohen | 117/138.8 F |
| 3,386,938 | 6/1968 | Finch | 117/138.8 F |
| 3,518,112 | 6/1970 | Hecht et al. | 117/138.8 F |

*Primary Examiner*—William D. Martin
*Assistant Examiner*—M. Sofocleous
*Attorney*—William J. Daniel

[57] ABSTRACT

The tendency of polyester films to attract dust and develop scratches is reduced by applying to each side of such films a coating having a perceptible thickness of at most 0.1 $\mu$ and essentially consisting of 70 to 90 percent by weight of a waxy material having a melting point about 75° C and 30 to 10 percent by weight of an antistatic compound.

6 Claims, No Drawings

ANTISTATIC POLYESTER FILM

The invention relates to a process for the manufacture of antistatic polyester films which do not attract dust and possess excellent optical properties, and to polyester films thus prepared.

According to the invention a process is provided for the manufacture of antistatic polyester films comprising applying to both sides of an oriented polyester film a coating, which is not thicker than 0.1 $\mu$ and essentially consists of a waxy material melting above 75° C. The waxy material may be natural waxes, i.e. animal, vegetable or mineral waxes, or chemically modified natural waxes, or synthetic waxes.

In order further to increase the antistatic properties of the thin coating on the polyester films and to minimize the attraction of dust, 10 to 30 percent by weight of an antistatic compound the percent of weight being calculated on the total weight of the dry coating, is preferably added to the coating composition of the antistatic layers.

The coatings described in the present specification are applied to a polyethylene terephthalate film support. They can, however, be applied to other polyester films, e.g. polyesters resulting from the polycondensation of glycol or mixtures of glycols with terephthalic acid or mixtures of terephthalic acid with minor amounts of other dicarboxylic acids such as isophthalic acid, diphenic acid, and sebacic acid. Further, the antistatic coatings of the present invention can be applied also to other film supports, e.g. film supports of cellulose derivatives e.g. cellulose triacetate and film supports of polycarbonates.

The following is a non-limitative list of waxes and waxy materials suitable for use in accordance with the present invention:

A. Vegetable waxes:
   carnauba wax
   ouricury wax
   candelilla wax
   sugar cane wax
   japan wax
B. Animal waxes:
   spermaceti wax
   wool wax
C. Insect waxes:
   beeswax
   chinese insect wax
   shellac wax
D. Petroleum waxes:
   paraffin waxes of various grades such as paraffin 136–138, which means paraffin melting at 136°–138° F (=58°–59° C)
   petroleum wax (vaselin)
E. Mineral waxes:
   ozocerit wax
   ceresin
   Utah wax
   peat wax
   montan wax
F. Synthetic waxes or waxy materials:
   1. Wax-like components that occur individually in natural waxes, more particularly:
      a. the wax-like fatty saturated alcohols: hexadecyl alcohol and octadecyl alcohol and mixtures thereof such as lanette wax;
      b. the wax-like unbranched saturated fatty acids of the formula $C_nH_{2n+1}COOH$ wherein $n$ is an integer of at least 11, particularly myristic, palmitic, and stearic acid,
      c. synthetic esters derived from fatty acids and fatty alcohols which are of the natural wax ester type:
         n-hexadecyl palmitate
         stearyl stearate
         n-hexadecyl myristate
   2. Other synthetic esters derived from fatty acids such as:
      the wax-like esters sold under the trade name GLYCO WAX S 932 by Glycol Chemicals Inc., New York, N.Y., U.S.A.
      pentaerythritol esters of fatty acids such as stearic acid, palmitic acid, and lauric acid, e.g. P-TETRASTEARATE (trade name for a pentaerythritol ester of stearic acid of Hercules Powder Cy. Inc., Wilmington, Del., U.S.A.)
      alkyl esters of 12-hydroxy-stearic acid e.g. octadecyl-12-hydroxy-stearate,
      sucrose-diesters of fatty acids such as sucrose distearate marketed under the trade name SES-2, T-1 by Sucrose Chemical Division of Colonial Sugars Company, Gramercy, Louisiana, U.S.A.,
      esters of fatty acids and hexitol anhydrides derived from sorbitol such as sorbitan monostearate marketed under the trade names SPAN 60 and ARLACEL 60 by Atlas Refining Co., Wilmington, Del., U.S.A.
   3. Synthetic paraffin waxes e.g. those known as the Fisher-Tropsch waxes, which are long-chain aliphatic hydrocarbons.
   4. The hydrogenated oils e.g. hydrogenated castor oil and sperm oil such as CASTORWAX (trade name for hydrogenated castor oil of the Baker Castor Oil Co., Bayonne, N.J., U.S.A.) and SPERMAFOL 52 (trade name for hydrogenated sperm oil marketed by Archer Daniel Midland Co., Minneapolis, Minn., U.S.A.).
   5. Chemically modified natural waxes amongst which:
      a. the halogenated hydrocarbons such as chlorinated paraffins,
      b. the partly oxidized paraffins,
      c. montan wax derivatives such as the Hoechst waxes formerly known as I.G.-waxes or Gersthofen Waxes, which are generally glycerol, glycol or polymerized ethylene glycol esters of acids from montan wax,
   6. Amide derivatives of fatty acids, e.g. behenic acid amide, stearamide such as GOUDAMINE-S (trade name for stearamide of Gouda - Apollo N.V., Gouda, The Netherlands), the waxes sold under the trade name CERAMID and ACRAWAX by Glyco Chemicals Inc., New York, N.Y., U.S.A. for stearic acid monoethanolamide and for the reaction product of hydrogenated castor oil with monoethanolamine respectively, the CARLISLE Waxes (trade name of Carlisle Chemical Works, Reading, Ohio, U.S.A. for amide waxes) such as CARLISLE 280 WAX (trade name for N,N-ethylene-bis-stearamide) and CARSISLE 400 WAX (trade name for a N,N-alkylene-bis fatty acid amide).

More details about waxes and waxy thermoplastic materials can be found in "The Chemistry and Technology of Waxes," by A. H. Warth, 2nd Ed., 1956, Reinhold Publishing Corporation, New York, U.S.A., and in "Industrial Waxes" Vol. I, by H.Bennett, 1963, Chemical Publishing Company Inc., New York, U.S.A.

Although all these waxes and waxy materials can be used for applying extremely thin antistatic layers to oriented polyester films, high-melting products melting above approximatively 75° C are preferred, so that layers can be obtained, which even at temperatures somewhat higher than room temperature, are firm and non-tacky.

Most of the waxes applied to a polyester film support as a layer having a thickness of 0.5 to 5 $\mu$ in normal applications reduce the chargeability of this polyester film support so that they do not attract dust anymore. Examples of waxes and wax-like products, which can be used in this matter, are:
Carlisle 315-Wax
Ceramid
Hoechst waxes
sucrose distearate
behenic acid amide.

The appearance of these films is adversely affected by disturbing color refraction spots resulting from a color refraction between the wax layer having a critical thickness and the support. It has been found, that this effect disappears in the case of considerably thicker and thinner layers. When the layers are considerably thicker (approximatively 10 μ) the coated film cannot be used in various applications because of too high a scratchability and tackiness of the coated layers. Such thick layers can be used however on a polyester film support for the manufacture of heat-sealable packaging films. In the case of thinner layers (less than approximatively 0.2 μ) the dust attracting power often increases, and it has been discovered that the property of not attracting dust can be regained by adding to the waxy material to be used according to the invention anionic, cationic, or amphoteric antistatic products. The best results are obtained if the dry layer consists of 70–90 percent by weight of the waxy material and 10–30 percent by weight of an antistatic product (the percent by weight is calculated on the total weight of the dry layer).

These antistatic products are classified as follows:
A. Anionic products:
  sulphates
  sulphonates
  phosphates
  carboxylates
B. Cationic products:
  pyridinium compounds
  morpholinium compounds
  onium compounds.
C. Amphoteric products.

Very important cationic products are e.g. the quaternary ammonium compounds corresponding to he following general formula:

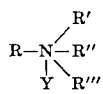

wherein:
R represents an aliphatic or alicyclic hydrocarbon group having at least seven carbon atoms,
R′ represents $(C_nH_{2n}O)_mH$ wherein n is 2, 3 or 4 and m is at least 3,
R″ represents an alkyl or hydroxyalkyl group having one to five carbon atoms or has the same significance as R′,
R‴ represents a hydrogen atom or has the same significance as R″,
Y represents an anion such as halides e.g. chloride, bromide, fluoride or iodide, sulphates, sulphonates, phosphates, phosphites, hydroxide, carbonate, sulphite, and hydrogen sulphite, nitrate and nitrite, oxalate, silicate, sulphide, acetate, ethyl sulphate.

Examples of such compounds are hexadecyl diethyl hexaethaneoxy ammonium chloride, dodecyl dipropyl tetraethaneoxy ammonium bromide, octyl butyl di(hexaethaneoxy) ammonium sulphate and decyl tri(decaethaneoxy)ammonium acetate.

Another group of quaternary ammonium compounds that can be used as an antistatic product according to the invention, is formed by the compounds corresponding to the following general formula:

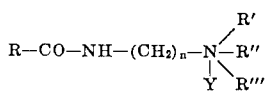

wherein:
R represents an aliphatic or alicyclic group having at least seven carbon atoms,
each of R′ and R″ represents an alkyl or hydroxyalkyl group having one to three carbon atoms,
R‴ represents a hydroxyalkyl group, and
Y represents an anion as described above.

Examples of the latter group of quaternary ammonium compounds are e.g. stearamidopropyl-dimethyl(β-hydroxyethyl)ammonium chloride, caprilamidopropyldimethyl(β-hydroxyethyl)ammonium chloride, stearamidopropyl-dimethyl-dihydroxypropylammonium ammonium chloride, stearamidopropyl- dimethylbenzylammonium chloride, lauramidomethyl-bis (β-hydroxyethyl) ammonium chloride and the same compounds having however other anions e.g. a phosphate group instead of the chloride group.

Suitable amphoteric antistatic compounds correspond to the following general formula:

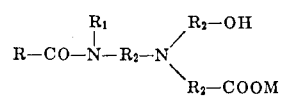

wherein:
R represents a hydrocarbon group having four to eighteen carbon atoms,
$R_2$ represents an aliphatic hydrocarbon group having one to four carbon atoms, which may be substituted with (a)hydroxyl group(s); aliphatic ether groups, each of these groups containing an ether group between hydrocarbon groups having two to four carbon atoms; aliphatic keto groups, each of these groups containing a carbonyl group between hydrocarbon groups having two to four carbon atoms,
$R_1$ represents a hydrogen atom or a monovalent radical of the classes defined for $R_2$,
M represents an alkaline metal.

An example of such an amphoteric antistatic compound is:

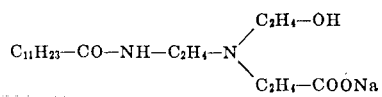

The waxy product and the antistatic compound, if any, are dissolved in inert organic solvents e.g. in chlorinated hydrocarbons such as methylene chloride, dichloroethane, perchloroethylene or in organic solvents e.g. methanol, ethanol or acetone. The resulting solution is applied to both sides of the polyester film support.

The application can be carried out according to known methods such as spray, brush, roller, doctor blade, air brush, or wiping techniques. Anyway, there should be taken care that the thickness of the dried layers on both sides of the film support does not exceed 0.1 μ. The layer should be dried preferably at a temperature beyond the melting point of the wax. As a result of the use of the extremely thin coatings according to the invention, the coated film has an exceptional clarity and is less susceptible to abrasion due to the lowering of the coefficient of friction, resulting from the use of such coatings.

The thus coated film supports can be used as a mounting foil, a drafting foil, or as support for a recording material.

Example 1

An oriented polyethylene terephthalate film support having a thickness of 100 μ is coated at both sides with the following composition at a ratio of 100 sq.m/liter:

| | |
|---|---:|
| Behenic acid amide (melting at 100° C) | 1.5 g |
| stearamidopropyl-(β-hydroxyethyl) ammonium nitrate | 0.2 g |
| methylene chloride | 400 ml |
| dichloroethane | 600 ml |

The film is then dried at 120° C. The coating on the support had a thickness of approximately 0.02 μ. A clear film was obtained which was highly scratch resistant. In contradistinction with an uncoated polyethylene terephthalate film support the coated film support does not attract dust. The film support is very suited for mounting purposes. The reduction of the dust attraction can be proved by the following simple laboratory tests. A film strip having a width of 35 mm and a length of 50 cm, taken from the film to be examined, was rubbed lengthwise and repeatedly on a small pad of filt or cotton and immediately thereafter held above a dish comprising cigarette-ash or ravelled cotton wadding. Uncoated polyester film attracts a large amount of ash or wadding, whereas film coated according to the method of the present example does not attract dust.

The reduction of dust attraction is not due to the high conductivity of the layer, but results from its non-chargeability. This is proved by the chargeability data listed in the following table, which entirely differ from those of an uncoated polyester film support.

For measuring the chargeability an apparatus is used, wherein a measuring strip of the material to be examined is placed on an electrically isolated measuring table. The sample of the material which acts as a comparison material for the measurement of the chargeability (brass or rubber), is mounted on a rubbing support. The rubbing support is connected with an electrometer having a constant capacity between the inputs. The picocoulomb transferred from the strip to the rubbing support is read on the electrometer.

| Strip to be measured | Charge in picocoulomb | |
|---|---|---|
| | Compared with brass | Compared with rubber |
| uncoated polyester film support | +9.500 | +24.000 |
| strip of example 1 | −4.000 | −6.000 |

Example 2

Both sides of an oriented polyethylene terephthalate film support having a thickness of 100 μ are coated with the following solution:

| sucrose distearate (melting point at about 92° C) | 2 g |
| sodium lauryl sulphate | 0.3 g |
| methanol | 150 ml |
| acetone | 850 ml |

Both layers were coated at a ratio of 100 sq.m/l. The layers were dried at 120° C.

Clear, scratch-free films, which practically attracted no dust were obtained. If desired, the sucrose distearate may be used without the addition of sodium lauryl sulphate without practical detriment to the property of not attracting dust.

Examples 3–6

The process of Example 2 was repeated, but the sucrose distearate was replaced in one instance by a same amount of sucrose monostearate (melting at about 190° C), and in another instance the lauryl sulphate of Example 2 was replaced by the same amount of diethyl (β-hydroxyethyl) ammonium octylphosphate, or hexadecyltrimethylammonium chloride, or the sodium salt of imino-trimethylphosphate.

In all instances a clear, poorly scratchable film was obtained, which attracted practically no dust.

Example 7

An oriented polyethylene terephthalate film support was coated at a ratio of 80 sq.m/l with the following solution:

| ceramid | 2 g |
| sodium salt of oleyl methyl tauride | 0.3 g |
| dichloroethane | 300 ml |
| methylene chloride | 600 ml |
| methanol | 100 ml |

The layers were dried at ±100° C.

Clear, poorly scratchable film supports, which attracted practically no dust, were obtained.

Examples 8–11

The process of Example 7 24 was repeated, but the sodium salt of oleyl methyl tauride was replaced by a same amount of stearamido-propyldimethyl(β-hydroxyethyl)-ammonium nitrate, of ULTRAVON W, of the sodium salt of dioctyl sulphosuccinic acid, or of the sodium salt of dodecylbenzene sulphonate.

ULTRAVON W is a trade name of a compound corresponding to the formula:

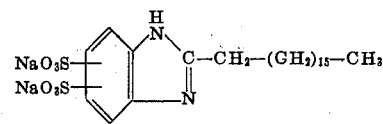

marketed by Ciba A.G., Basel, Switzerland.

Clear, poorly chargeable films were obtained.

Example 12

A solution consisting of:

| Ceramid | 2 g |
| diethyl(2-hydroxyethyl)ammonium octylphosphate | 0.5 g |
| methylene chloride | 250 ml |
| perchloroethylene | 750 ml | diethyl(β-hydroxyETHYL)ammonium was applied at a ratio of 100 sq.m/l to both sides of an oriented polyethylene terephthalate film support having a thickness of 100 μ. Subsequently the resulting layer was dried at approximately 80° C.

A clear film support, which attracts practically no dust, was obtained.

Example 13

The process of Example 12 was repeated, but Ceramid was replaced by a same amount of montan wax. A clear film support attracting practically no dust was obtained.

Example 14

The process of Example 12 was repeated, but the Ceramid was replaced by a same amount of Carnauba wax.

A very clear, poorly scratchable film support, attracting practically no dust was obtained.

Example 15

The process of Example 12 was repeated, but instead of Ceramid a same amount of beeswax was used.

A clear, poorly scratchable film support, attracting practically no dust, was obtained.

Example 16

A solution consisting of 1.5 g of stearic acid and 0.3 g of diethyl(β-hydroxyethyl)ammonium octyl phosphate was applied at a ratio of 80 sq.m/l to both sides of an oriented polyethylene terephthalate film support. The resulting layers were dried at 100° C.

A clear film support, attracting practically no dust was obtained.

We claim:

1. Antistatic polyester films consisting of an oriented polyester film support provided on both sides of a continuous film coating having a perceptible thickness not greater than 0.1 μ and consisting of 70 to 90 percent by weight of a waxy material having a melting point above 75° C and of 30 to 10 percent by weight of an antistatic compound, the percent by weight being calculated on the total weight of the dry coating.

2. A polyester film according to claim 1, wherein the waxy material is behenic acid amide.

3. A polyester film according to claim 1, wherein the waxy material is sucrose distearate.

4. A polyester film according to claim 1, wherein the antistatic agent is stearamidopropyldimethyl (β-hydroxyethyl)-ammonium nitrate.

5. A polyester film according to claim 1, wherein the antistatic agent is sodium lauryl sulphate.

6. A polyester film according to claim 1, wherein the antistatic agent is the sodium salt of oleylmethyl tauride.

* * * * *